United States Patent [19]

Masui et al.

[11] Patent Number: 5,034,076
[45] Date of Patent: Jul. 23, 1991

[54] METHOD FOR PRESS MOLDING THERMOPLASTIC RESINS

[75] Inventors: Shohei Masui; Yoshiaki Togawa, both of Kyoto; Kanemitsu Oishi, Shiga; Kiyoshi Mitsui, Chiba; Nobuhiro Usui; Shigeyoshi Matubara, both of Osaka, all of Japan

[73] Assignee: Sumitomo CHemical Company, Limited, Osaka, Japan

[21] Appl. No.: 595,796

[22] Filed: Oct. 9, 1990

Related U.S. Application Data

[63] Continuation of Ser. No. 302,088, Jan. 25, 1989, abandoned, which is a continuation of Ser. No. 63,112, Jun. 17, 1987, abandoned.

[30] Foreign Application Priority Data

Jun. 17, 1986 [JP] Japan ................................ 61-142271

[51] Int. Cl.$^5$ ...................... B29C 43/18; B29C 65/18
[52] U.S. Cl. ........................ 156/79; 156/245; 264/154; 264/163; 264/257; 264/266; 264/273; 425/112
[58] Field of Search ............ 264/154, 156, 163, 266, 264/273, 328.7, 257; 425/112, 129.1; 156/228, 304.1, 304.6, 79, 245

[56] References Cited

U.S. PATENT DOCUMENTS

| | | | |
|---|---|---|---|
| 2,291,545 | 7/1942 | Ganz et al. | |
| 3,184,527 | 5/1965 | Fischer | 264/135 |
| 3,807,146 | 4/1974 | Witkowski | 264/DIG. 48 |
| 4,310,376 | 1/1982 | Ebina et al. | 156/228 |
| 4,527,709 | 7/1985 | Kondo et al. | 220/20.5 |

FOREIGN PATENT DOCUMENTS

| | | | |
|---|---|---|---|
| 0186015 | 7/1986 | European Pat. Off. | 264/266 |
| 2856618 | 12/1978 | Fed. Rep. of Germany . | |
| 50-7860 | 9/1975 | Japan . | |
| 55-109638 | 8/1980 | Japan | 264/266 |
| 56-117639 | 9/1981 | Japan . | |
| 61-24939 | 2/1986 | Japan . | |
| 1449472 | 9/1976 | United Kingdom . | |

*Primary Examiner*—Jan H. Silbaugh
*Assistant Examiner*—Catherine Timm
*Attorney, Agent, or Firm*—Birch, Stewart, Kolasch & Birch

[57] ABSTRACT

A multi-layer molded article including a thermoplastic resin body having a plurality of ribs and/or bosses on one side and a layer of a foam which is laminated on the side of the thermoplastic resin body having ribs and/or bosses is produced by a press molding method. The method involves the steps of supplying a foam between upper and lower halves of a mold, one of which has plurality of slits and/or holes corresponding to the ribs and/or bosses to be formed, supplying a quantity of a plasticized thermoplastic resin melt between the already supplied foam and the half of the mold not having any slit or hole, moving at least one half of the mold during supplying the thermoplastic resin or just after completion of supply of the thermoplastic resin to press mold the thermoplastic resin so that the plasticized thermoplastic resin breaks at least a part of areas of the foam on the slits and/or holes of the half of the mold to flow into the slits and/or holes and to form the ribs and/or bosses.

12 Claims, 3 Drawing Sheets

METHOD FOR PRESS MOLDING THERMOPLASTIC RESINS

This application is a continuation of application Ser. No. 07/302,088 filed on Jan. 25, 1989, which was a continuation of application Ser. No. 07/063,112 filed on June 17, 1987, both of which are now abandoned.

BACKGROUND OF THE INVENTION

1. Field of the Invention

The present invention relates to a method for press molding a thermoplastic resin. More particularly, it relates to a method for producing a multi-layer molded article comprising a molded thermoplastic resin body having a plurality of ribs and/or bosses and a layer of a foam on the side of the molded thermoplastic resin body having the ribs and/or bosses. Such article is usually used as a heat insulator and the like.

2. Description of Prior Art

Conventionally, a multi-layer molded article of FIGS. 1 and 2 is produced by molding a thermoplastic resin body 1 having the ribs 2 and/or bosses 3 by, for example, injection molding and then supplying a foamable material such as urethane with a suitable tool followed by foaming of the material. However, this method requires the suitable tools, involves a number of steps, and is expensive.

Instead of supplying foamable urethane, foam body parts corresponding to the ribs and/or bosses which are cut out may be laminated on the molded thermoplastic resin body. However, when the ribs and/or bosses have complicated shapes or patterns, processability is considerably deteriorated.

Another practically employed method comprises supplying a foam having a suitable shape in a mold and supplying a plasticized melt thermoplastic resin in the mold to integrate the foam with the thermoplastic resin body. It is possible to shape an article of the thermoplastic resin having a layer of the foam by supplying the foam parts of which corresponding parts to the ribs and/or bosses are cut out when the foam is laminated on the side of the thermoplastic resin body having the ribs and/or bosses. However, this method still has some disadvantages such that the resin material protrudes on the opposite side at the cut out parts.

SUMMARY OF THE INVENTION

One object of the present invention is to provide a novel method for producing a multi-layer molded article comprising a thermoplastic resin body and a foam layer by press molding, which method can overcome the disadvantages of the conventional methods.

Another object of the present invention is to provide a method for producing a multi-layer molded article comprising a thermoplastic resin body having a plurality of ribs and/or bosses and a foam layer which is laminated on the side of the thermoplastic resin body having the ribs and/or bosses by press molding.

These and other objects of the present invention are achieved by a method for producing a multi-layer molded article comprising a thermoplastic resin body having a plurality of ribs and/or bosses on one side and a layer of a foam which is laminated on the side of the thermoplastic resin body having ribs and/or bosses by press molding, which method comprises the steps of supplying a foam between upper and lower halves of a mold, one of which has a plurality of slits and/or holes corresponding to the ribs and/or bosses to be formed, supplying a quantity of a plasticized thermoplastic resin melt between the already supplied foam and the half of the mold not having any slit or hole, and moving at least one half of the mold during the supplying of the thermoplastic resin or just after completion of supply of the thermoplastic resin to press mold the thermoplastic resin so that the plasticized thermoplastic resin breaks at least a part of the areas of the foam on the slits and/or holes of the half of the mold to flow into the slits and/or holes and to form the ribs and/or bosses.

DETAILED DESCRIPTION OF THE INVENTION

Figure 1:
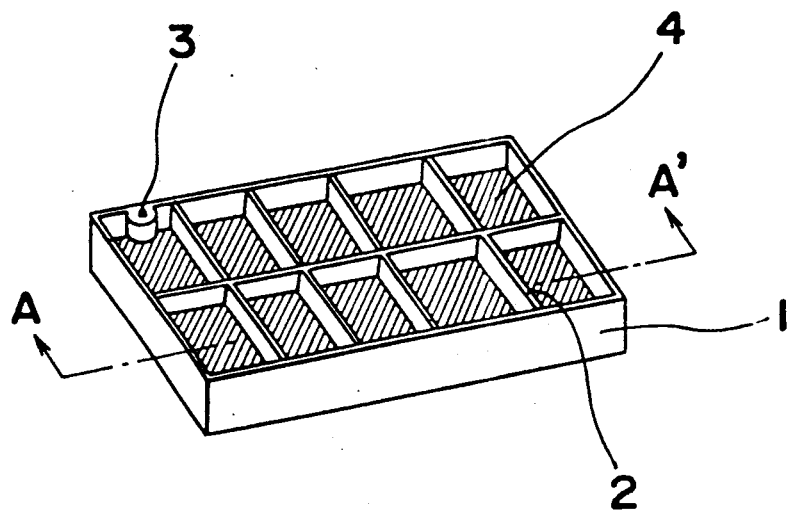
FIG. 1 is a perspective view of one embodiment of a multi-layer molded article produced by the method of the present invention.
Figure 2:
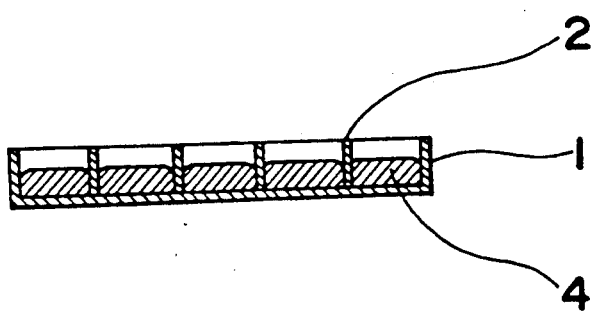
FIG. 2 is a cross section of the multi-layer molded article of FIG. 1 along the line A—A'.

One embodiment of the multi-layer molded article produced by the method of the present invention shown in FIGS. 1 and 2 consists of a thermoplastic resin body 1 having ribs 2 and boss 3 and a layer of the foam 4.

Figure 3:
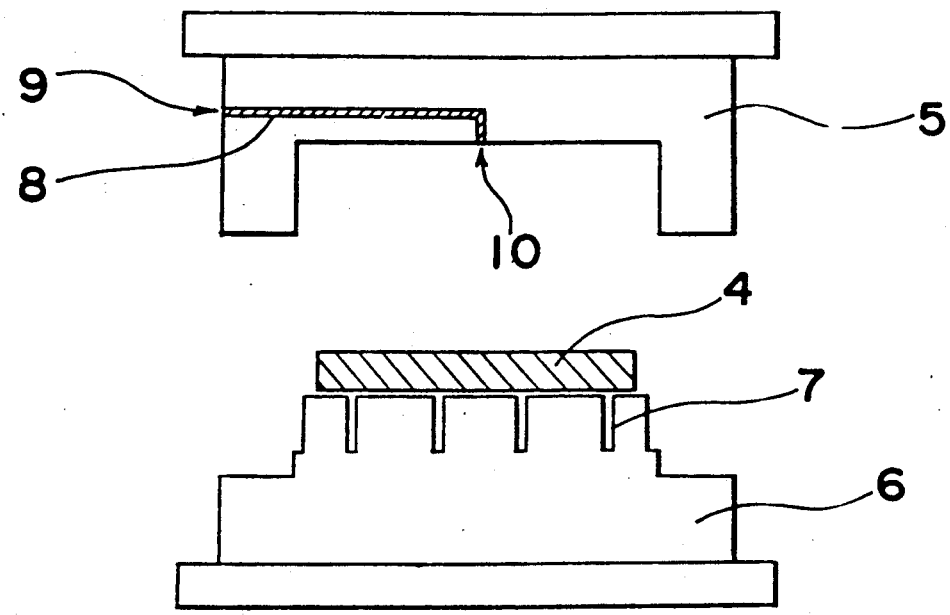
FIGS. 3 to 5 show the steps of the method of the present invention.
Figure 4:
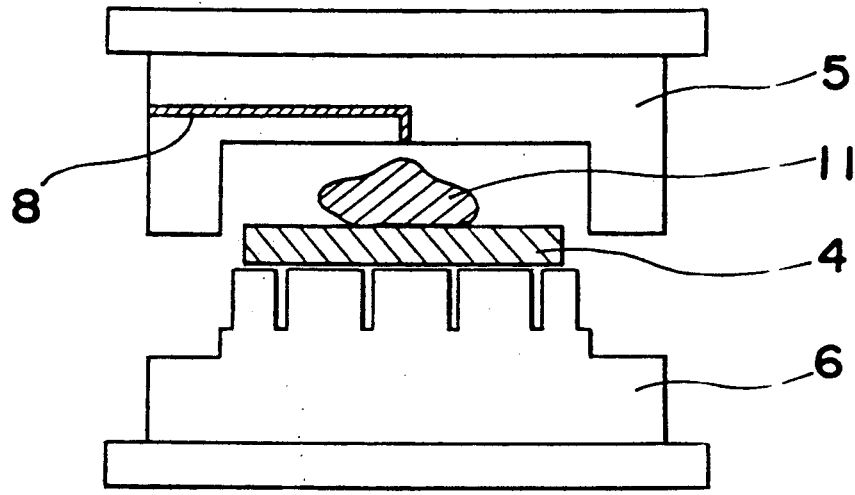
Figure 5:
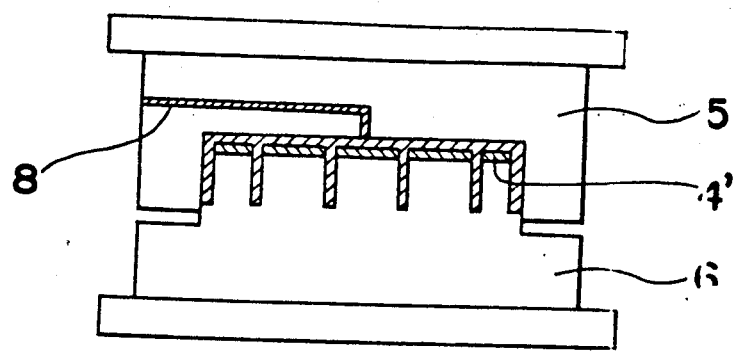

FIGS. 3 to 5 illustrate steps of the method of the present invention, wherein a mold consists of an upper half 5 attached to an upper platen of a press (not shown) and a lower half 6 attached to a lower platen of the press (not shown).

The lower half 6 of the mold has slits 7 for forming the ribs and/or holes (not shown) for forming the bosses.

The upper half 5 of the mold has a feed passage 8 through which the resin melt is supplied from a resin supplier (not shown) connected to an opening 9 of the passage to a cavity defined by the upper and lower halves of the mold.

At a feed opening 10 of the passage 8, a valve (not shown) which opens when the melt resin is supplied and closes when the melt resin is not supplied may be provided.

For supplying the resin melt, there may be used a supplying die of a rod or sheet shape or a multi-tip die, the tip(s) of which is placed in the cavity defined by the upper and lower halves of the mold in the step for supplying the resin melt and removed from the cavity in the step wherein the resin melt is not supplied.

The molding steps of the present invention will be explained. As shown in FIG. 3, first a sheet of the foam 4 is placed on the upper surface of the lower half of the mold having the slits and/or holes. The foam may be polyurethane foam, polyvinyl chloride foam, polyethylene foam, polypropylene foam, rubber sponge and the like. The layer of foam may be laminated with a sheet of paper or nonwoven fabric or a film of a thermoplastic resin which may be the same as or different from the thermoplastic resin to be molded.

The sheet of the foam is placed directly on the upper surface of the lower half of the mold, or supported by a suitable supporting member. Then, the upper and lower halves of the mold are moved to suitable positions with each other at which they are not completely closed as shown in FIG. 4, and the plasticized melt resin 11 is supplied from the feed opening 10 through the passage 8 into a cavity defined by the upper half of the mold and the sheet of the foam. While the resin melt is being supplied or just after the resin supply is completed, the halves 5 and 6 of the mold are moved further in close to each other to press the melt resin by them.

As the upper and lower mold halves are moved in close to each other and closed, the foam 4 is pressed and not only the resin melt 11 spreads towards a periphery of the mold but also it breaks through at least a part of the areas of the foam positioned on the slits and/or holes and fills them. Thereby, the molded article comprising the thermoplastic body having ribs and/or bosses and the layer of the foam on the side of the resin body having the ribs and/or bosses is produced.

To break the sheet of the foam in all the areas positioned on the slits and/or holes of the lower half of the mold to fill them with the resin melt, the filling rate of the melt resin in the slits and/or holes should not be larger than that in parts of a top plate of the resin at which the ribs and/or bosses are connected therewith. This can be achieved by narrowing the width of the rib or boss, or providing a notch to the rib or boss. If the former rate is larger than the latter rate at one part, a part of the sheet of the foam is not broken by the the melt resin so that the top plate of the resin and the rib or boss are separated from each other at that part. Such partial separation of the top plate of the resin and the rib and/or boss is not harmful to the multi-layer molded article since other parts of the ribs and/or bosses are connected with the top plate of the resin.

When the press molding of the thermoplastic resin is completed, the sheet of the foam is in a pressed state 4' as shown in FIG. 5. Once the upper and lower halves of the mold are separated from each other and pressure is reduced, the foam recovers and tends to return to its expanded state having a thickness according to its compression-recover characteristics.

In the above described embodiment, the lower half of the mold has the slits and/or holes and the upper half of the mold has the feed passage through which the resin melt is supplied. Alternatively, the upper half of the mold may have the slits and/or holes, and the lower half of the mold may have the feed passage through which the resin melt is supplied.

Figure 6:
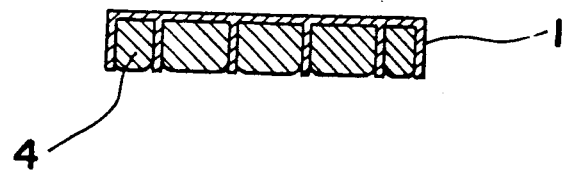
FIG. 6 is a cross section of another embodiment of a multi-layer molded article produced by the method of the present invention.

When the ratio of the depth of the slit to an original thickness of the sheet of foam is substantially the same as a compression-recover ratio of the foam under the molding conditions, a multi-layer article comprising the sheet of the foam having a thickness which is substantially the same as the depth of the rib is obtained as shown in FIG. 6.

Herein, "a compression-recover ratio" of the foam is intended to mean a ratio of a thickness of the foam layer of the produced article to that of the sheet of the foam before being press molded.

Figure 7:
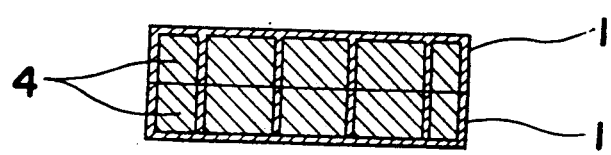
FIG. 7 is a cross section of an article consisting of a pair of the articles of FIG. 6.

When a pair of the multi-layer molded article as shown in FIG. 6 in which the thickness of the foam layer is substantially the same as the depth of the rib are bonded by heat plate welding, a panel shape article as shown in FIG. 7 in which the interior of the thermoplastic resin body is filled with the foam can be produced. To obtain a panel shape article, the multi-layer molded article of FIG. 6 may be bonded to any article having any shape or made of any material insofar as the latter can be bonded with the multi-layer molded article by heat plate welding, ultrasonic welding, or with an adhesive.

The molding conditions such as resin temperature and mold temperature may be substantially the same as those employed in the conventional injection molding. The molding pressure is about one third of the injection molding pressure or less.

Practically and presently preferred embodiments of the present invention will be illustrated by the following examples.

EXAMPLES 1

A multi-layer molded article as shown in FIGS. 1 and 2 of 600 mm in length, 300 mm in width and 16.5 mm in height which had lattice form ribs each 15 mm in height and 1.2 mm in thickness and a layer of polyurethane foam of 12.5 mm in thickness bonded on the side having the ribs was produced as follows:

On a lower half of a mold having slits for forming the ribs kept at 50° C., a sheet of polyurethane foam (expansion ratio of 30) of 580 mm length, 280 mm in width and 30 mm in thickness was placed. After closing the upper and lower halves of the mold until a clearance of the cavity between them reached 40 mm with heating the upper half of the mold at 70° C., polypropylene melt (Melt Index: 15 grm/10 min. according to ASTM D1238-62T) was supplied on the polyurethane foam sheet from the feed passage in the upper half of the mold while keeping the melt at 220° C. Just after the supply of the polypropylene melt was completed, the upper and lower halves of the mold were again moved to close and mold the resin under a pressure of 55 kg/cm$^2$ to produce the multi-layer molded article.

EXAMPLE 2

Figure 8:
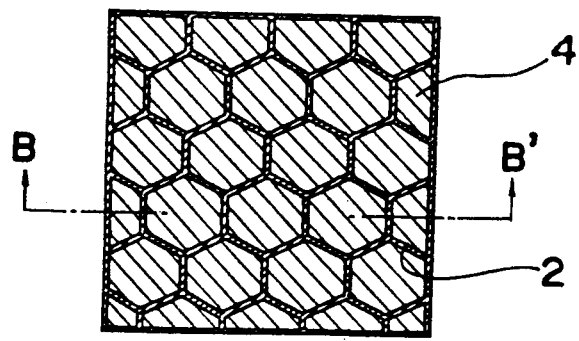
FIG. 8 is a plan view of a further embodiment of a multilayer molded article produced by the method of the present invention.
Figure 9:
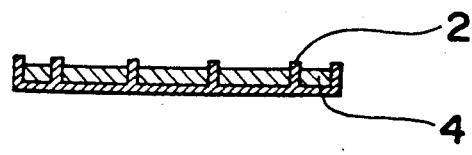
FIG. 9 is a cross section of the multi-layer molded article of FIG. 8 along the line B—B'.

A multi-layer molded article as shown in FIGS. 8 and 9 of 300 mm in length, 300 mm in width and 5.5 mm in height which had honeycomb form ribs each of 4 mm in height and 3 mm in thickness and a layer of polypropylene foam of about 3 mm in thickness bonded on the side having the ribs was produced as follows:

On a lower half of a mold having no slit for forming the ribs kept at 50° C., a sheet of polypropylene foam (expansion ratio of 15) of 290 mm length, 290 mm in width and 5 mm in thickness was placed. In this example, an upper half of the mold had slits for forming the ribs. After closing the upper and lower halves of the mold till a clearance of the cavity between them reached 10 mm with heating the upper half of the mold at 30° C., polypropylene melt (melt index: 3.0 grm/10 min. according to ASTM D1238-62T) was supplied from the feed passage in the lower half of the mold while keeping the melt at 260° C. Just after the supply of the polypropylene melt was completed, the upper and lower halves of the mold were again moved to close and mold the polypropylene resin under pressure of 100 kg/cm$^2$ to produce the multi-layer molded article.

What is claimed is:

1. A press molding method for producing a multi-layer molded article comprising a thermoplastic resin body having a plurality of ribs and/or bosses on one side thereof and a layer of a foam laminated on the same side of the thermoplastic resin body having said ribs and/or bosses, which method comprises the steps of:

supplying a sheet of foam having an original thickness between first and second halves of a mold, said first mold half having a plurality of slits and/or holes corresponding to said ribs and/or bosses to be formed and said second mold half having a feed passage therein through which plasticized thermoplastic resin melt is to be supplied;

supplying a quantity of plasticized thermoplastic resin melt between the sheet of foam and said second hold half through said feed passage;

moving at least one of said mold halves towards the other mold half while supplying said thermoplastic resin or just after completing the supply of said thermoplastic resin thereby pressing the sheet of foam to a thickness substantially less than said original thickness so that the foam is in a compressed state and press molding said thermoplastic resin so that said thermoplastic resin breaks areas of said compressed foam corresponding to said slits and/or holes of said first mold half and flows into said slits and/or holes thereby forming said ribs and/or bosses of said thermoplastic resin body; and moving said mold halves apart from each other thereby reducing pressure on said foam so that said foam recovers at least a substantial portion of the original thickness such that a final thickness according to its compression-recover characteristics is obtained.

2. The method according to claim 1, wherein a ratio of the depth of said slits or holes to the original thickness of said sheet of foam is substantially equal to a compression-recover ratio of said foam under the molding conditions, wherein the compression-recover ratio is a ratio of the final thickness of said sheet of foam of the produced article to the original thickness of said sheet of foam before being press molded.

3. The method according to claim 1, wherein said first half of the mold having slits and/or holes is a lower half of the mold, and said second half of the mold having a feed passage therein through which said thermoplastic resin melt is supplied is an upper half of the mold.

4. The method according to claim 1, wherein said first half of the mold having slits and/or holes is an upper half of the mold, and said second half of the mold having a feed passage therein through which said thermoplastic resin melt is supplied is a lower half of the mold.

5. The method according to claim 1, wherein said foam is a member selected from the group consisting of polyurethane foam, polyvinyl chloride foam, polyethylene foam, polypropylene foam, and rubber sponge.

6. The method according to claim 1, wherein said sheet of foam is laminated before being supplied in said mold with a sheet of paper, non-woven fabric, or a film of thermoplastic resin which may be the same or different from said thermoplastic resin to be molded.

7. The method according to claim 2, wherein said foam is a member selected from the group consisting of polyurethane foam, polyvinyl chloride foam, polyethylene foam, polypropylene foam and rubber sponge.

8. The method according to claim 7, wherein said sheet of foam is laminated before being supplied in said mold with a sheet of paper, non-woven fabric or a film of thermoplastic resin which may be the same or different from said thermoplastic resin to be molded.

9. The method according to claim 1, wherein the filling rate of said plasticized thermoplastic resin melt into said slits and/or holes is not larger than that of said thermoplastic resin being supplied to said sheet of foam.

10. The method according to claim 8, wherein the filling rate of said plasticized thermoplastic resin melt into said slits and/or holes is not larger than that of said thermoplastic resin being supplied to said sheet of foam.

11. The method according to claim 1, further comprising heat plate welding a pair of said multi-layer molded articles so as to form a panel-shaped article in which the interior is filled with aid foam.

12. The method according to claim 10, further comprising heat plate welding a pair of said multi-layer molded articles so as to form a panel-shaped article in which the interior is filed with said foam.

* * * * *